United States Patent
Chen et al.

(10) Patent No.: US 10,362,491 B1
(45) Date of Patent: Jul. 23, 2019

(54) SYSTEM AND METHOD FOR CLASSIFYING A PHYSICAL OBJECT

(71) Applicant: AT&T INTELLECTUAL PROPERTY I, L.P., Atlanta, GA (US)

(72) Inventors: Jie Chen, Watchung, NJ (US); Ke Zhang, Jersey City, NJ (US); Wenjie Zhao, Princeton, NJ (US); Yuning Yang, Basking Ridge, NJ (US); Xidao Wen, Pittsburgh, PA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/033,943

(22) Filed: Jul. 12, 2018

(51) Int. Cl.
*H04W 16/18* (2009.01)
*G06K 9/66* (2006.01)
*G06Q 50/08* (2012.01)

(52) U.S. Cl.
CPC ............. *H04W 16/18* (2013.01); *G06K 9/66* (2013.01); *G06Q 50/08* (2013.01)

(58) Field of Classification Search
CPC ....... G01C 15/00; G01S 19/42; G01S 5/0257; G06T 2207/10016; G06T 2207/30181; G06T 7/70; H04B 10/1129; H04B 3/54; H04L 41/12; H04L 43/08; H04L 43/16; H04L 43/50; H04N 7/183; H04W 16/18; G06K 9/66; G06Q 50/08
USPC .......................................... 455/466; 370/257
See application file for complete search history.

(56) References Cited

U.S. PATENT DOCUMENTS

| | | | |
|---|---|---|---|
| 8,818,031 B1 | 8/2014 | Kelly et al. | |
| 9,373,057 B1* | 6/2016 | Erhan | ................... G06K 9/6202 |
| 9,418,351 B2* | 8/2016 | Carr | ...................... G06Q 10/087 |
| 9,706,411 B2* | 7/2017 | Goswami | .............. H04W 16/18 |
| 9,760,806 B1 | 9/2017 | Ning et al. | |
| 9,811,756 B2 | 11/2017 | Liu et al. | |
| 9,904,849 B2 | 2/2018 | Estrada et al. | |
| 9,916,679 B2 | 3/2018 | Flynn et al. | |
| 10,097,241 B1* | 10/2018 | Bogdan | ..................... H04B 3/54 |
| 2003/0023412 A1* | 1/2003 | Rappaport | ............. G06Q 10/10 703/1 |
| 2006/0041375 A1* | 2/2006 | Witmer | ................... G01C 15/00 701/532 |
| 2012/0278723 A1* | 11/2012 | Knaggs | .................... H04L 67/36 715/738 |
| 2013/0027554 A1* | 1/2013 | Meadow | ........................ 348/144 |
| 2016/0140425 A1 | 5/2016 | Kulkarni et al. | |
| 2017/0301108 A1 | 10/2017 | Estrada et al. | |
| 2017/0351712 A1 | 12/2017 | Jung | |

(Continued)

*Primary Examiner* — Nathan S Taylor
(74) *Attorney, Agent, or Firm* — Baker Botts, LLP

(57) ABSTRACT

In one embodiment, a method includes receiving, by one or more interfaces, a location of a physical object and receiving, by the one or more interfaces and from a data platform, an image associated with the physical object and the location of the physical object. The method also includes extracting, by one or more processors and from the image, an attribute associated with a feature of the physical object and classifying, by one or more processors, the attribute, wherein classifying the attribute comprises associating the attribute with a characteristic of the feature of the physical object. The method further includes classifying, by the one or more processors, the physical object and determining, by the one or more processors, to identify the physical object as eligible for modification.

17 Claims, 6 Drawing Sheets

(56) References Cited

U.S. PATENT DOCUMENTS

| | | |
|---|---|---|
| 2017/0371897 A1 | 12/2017 | Strong et al. |
| 2018/0026718 A1* | 1/2018 | Leiba ................ H04B 10/1129 |
| | | 370/310 |
| 2018/0039867 A1 | 2/2018 | Cheng et al. |
| 2018/0084434 A1 | 3/2018 | Vuonnala et al. |
| 2018/0144558 A1* | 5/2018 | Priest ........................ G06T 7/00 |
| 2018/0158236 A1* | 6/2018 | Priest ...................... G06T 17/00 |
| 2018/0173243 A1* | 6/2018 | Park .................... G05D 1/0088 |
| 2018/0249343 A1* | 8/2018 | Priest .................... H04W 16/18 |
| 2018/0294839 A1* | 10/2018 | Bogdan .................... H04B 3/54 |
| 2019/0007099 A1* | 1/2019 | Bogdan .................... H04B 3/54 |

\* cited by examiner

SYSTEM AND METHOD FOR CLASSIFYING A PHYSICAL OBJECT

TECHNICAL FIELD

This disclosure generally relates to classifying an object, and more specifically to classifying a physical object.

BACKGROUND

Network densification involves increasing the number of cell sites to increase the amount of available capacity to a network (e.g., a 5G network). Identifying sites to install electronic communications equipment (e.g., telecommunications equipment such as small cells) may present challenges. For example, some local governments have established regulations for the installation of the communications equipment. These government regulations vary between different localities, making it difficult to identify cell sites in particular areas that are in compliance with the local regulations. As another example, sending engineers to a candidate cell site to manually inspect the properties of the cell site is time consuming, costly, and sometimes prone to human error.

SUMMARY

According to an embodiment, a system includes one or more processors and a memory storing instructions that, when executed by the one or more processors, cause the one or more processors to perform operations comprising receiving a location of a potential structure for installation of telecommunication equipment and receiving from a data platform an image of the potential structure. The operations further comprise extracting from the image an attribute associated with at least one of a fixture, a height, a material, a number of arms, and a style of the potential structure and classifying the attribute by associating the attribute with a characteristic of the at least one of the fixture, the height, the material, the number of arms, and the style of the potential structure. The operations further comprise classifying the potential structure for the installation of the telecommunication equipment in accordance with a local ordinance and determining to identify the potential structure as eligible for the installation of the telecommunication equipment.

According to another embodiment, a method includes receiving, by one or more interfaces, a location of a physical object and receiving, by the one or more interfaces and from a data platform, an image associated with the physical object and the location of the physical object. The method also includes extracting, by one or more processors and from the image, an attribute associated with a feature of the physical object and classifying, by one or more processors, the attribute, wherein classifying the attribute comprises associating the attribute with a characteristic of the feature of the physical object. The method further includes classifying, by the one or more processors, the physical object and determining, by the one or more processors, to identify the physical object as eligible for modification.

According to yet another embodiment, one or more computer-readable storage media embody instructions that, when executed by a processor, cause the processor to perform operations comprising receiving a location of a physical object and receiving an image associated with the physical object and the location of the physical object. The operations further comprise extracting an attribute associated with a feature of the physical object from the image and classifying the attribute, wherein classifying the attribute comprises associating the attribute with a characteristic of the feature of the physical object. The operations further comprise classifying the physical object and determining to identify the physical object as eligible for modification.

Technical advantages of certain embodiments of this disclosure may include the elimination or reduction of manual data collection and human labor, saving time and money. This may be accomplished by the use of machine learning to automatically determine a particular object (e.g., a utility pole) on which to install telecommunication equipment, as one example. This automatic process may eliminate the manual labor of scanning through and labeling images of potential cell deployment sites.

Such labor and time savings may also be effected through automating the telecommunications equipment candidate site selection process, and in particular, through utilizing an intelligent object recognition framework. Images may be collected of potential facilities in large scale via a data platform (e.g., an open source data platform for an online mapping service that provides images of physical objects). Open data source available in some urban markets may be leveraged to obtain training data for modelling. A deep learning methodology may be utilized to derive prominent features from the images. Knowledge may be extracted from general object recognition and transferred to facility attributes identification. Machine classification algorithms may be applied to classify the attributes of objects, such as utility poles, using the extracted features.

As still another advantage, the classification model described in this disclosure may be generalized to other markets. The classification model for pre-qualifying candidate locations for the installation of telecommunications equipment on physical objects such as utility poles may be generalized to pre-qualifying candidate locations for the installation of customer premise equipment in facilities such as rural homes for internet access via a cellular network, for example.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

Network densification involves identifying qualified facilities at candidate locations for deployment of communications equipment based on government regulations (e.g., requirements from a local ordinance). Structures such as columns or posts (e.g., utility poles and street lighting poles) are often used for communications equipment attachment, such as small cell attachment, given their spatial distributions and their proximity to an electric power source. Some governments have established regulations on the criteria of poles and other structures that can be used for communications equipment attachment. For example, certain local ordinances require the poles to be above a certain height, have a particular shape, or to be made of a certain type of material. Regulations vary broadly among different localities and there are numerous pole providers/manufacturers, making it difficult to search for valid candidates according to the government regulations.

According to the teachings of the disclosure, a system and method are provided that address the above-described problems. In general, a computer system may classify a physical object, such as a utility pole, as either qualified or not qualified for installation of telecommunication equipment in accordance with a local ordinance. The computer system may receive one or more images of the physical object from a data platform, extract attributes from the images, classify the extracted attributes using trained classifiers that include ground truth labels, and then classify the physical object based at least in part on the classified extracted attributes.

Figure 1A:
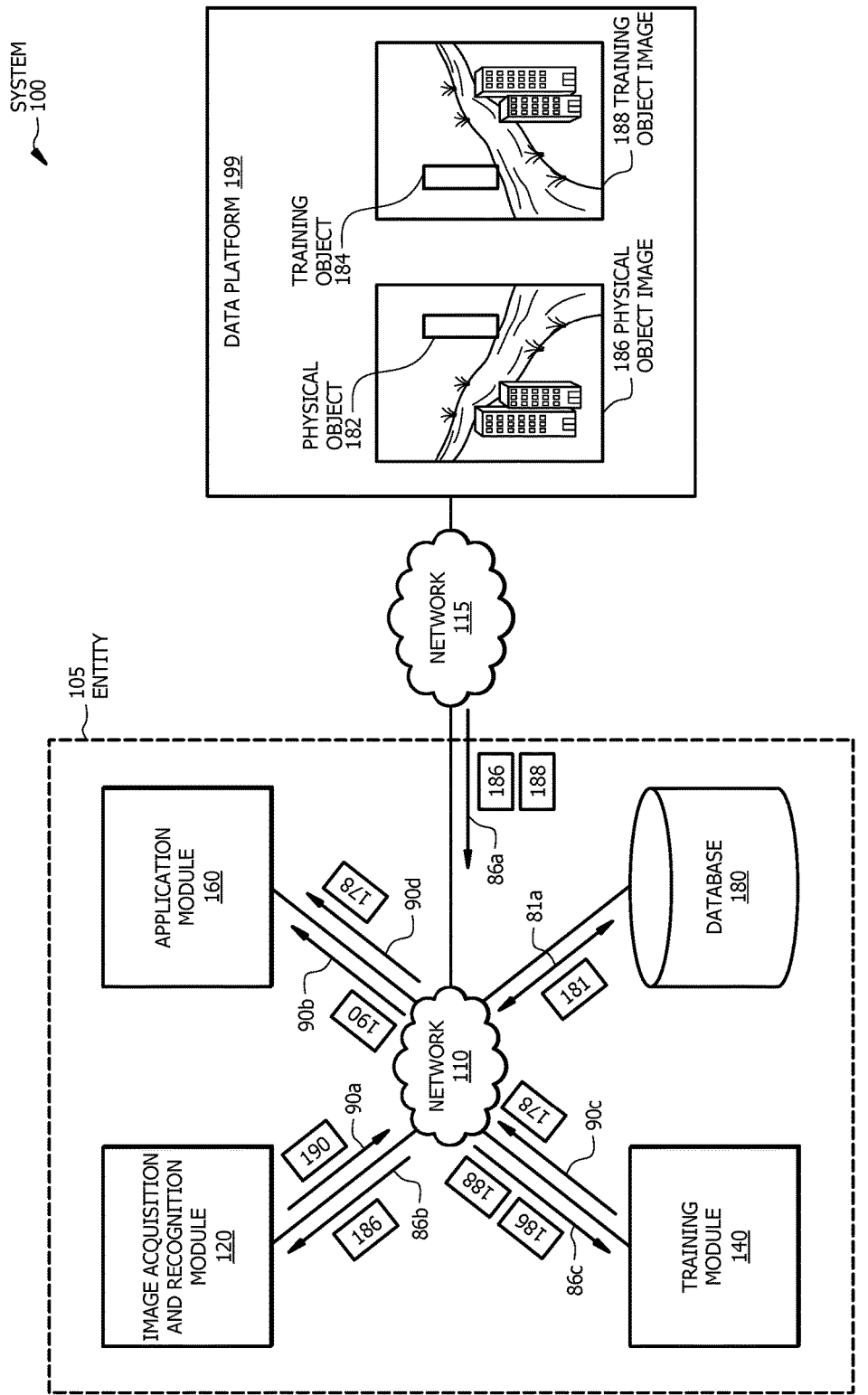
FIG. 1A illustrates an example system for classifying a physical object.
Figure 1B:
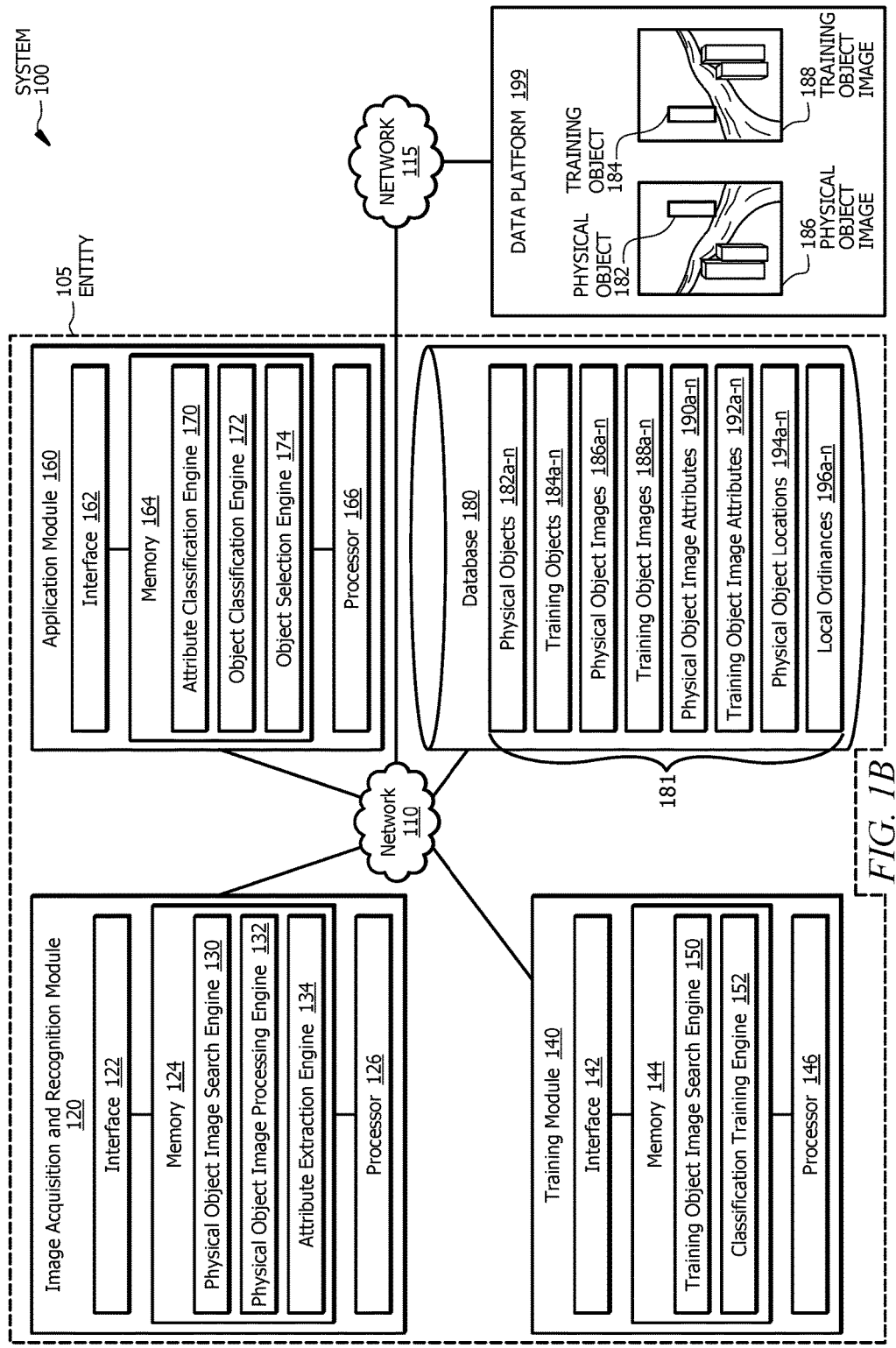
FIG. 1B illustrates additional details of the system of FIG. 1A.
Figure 1C:
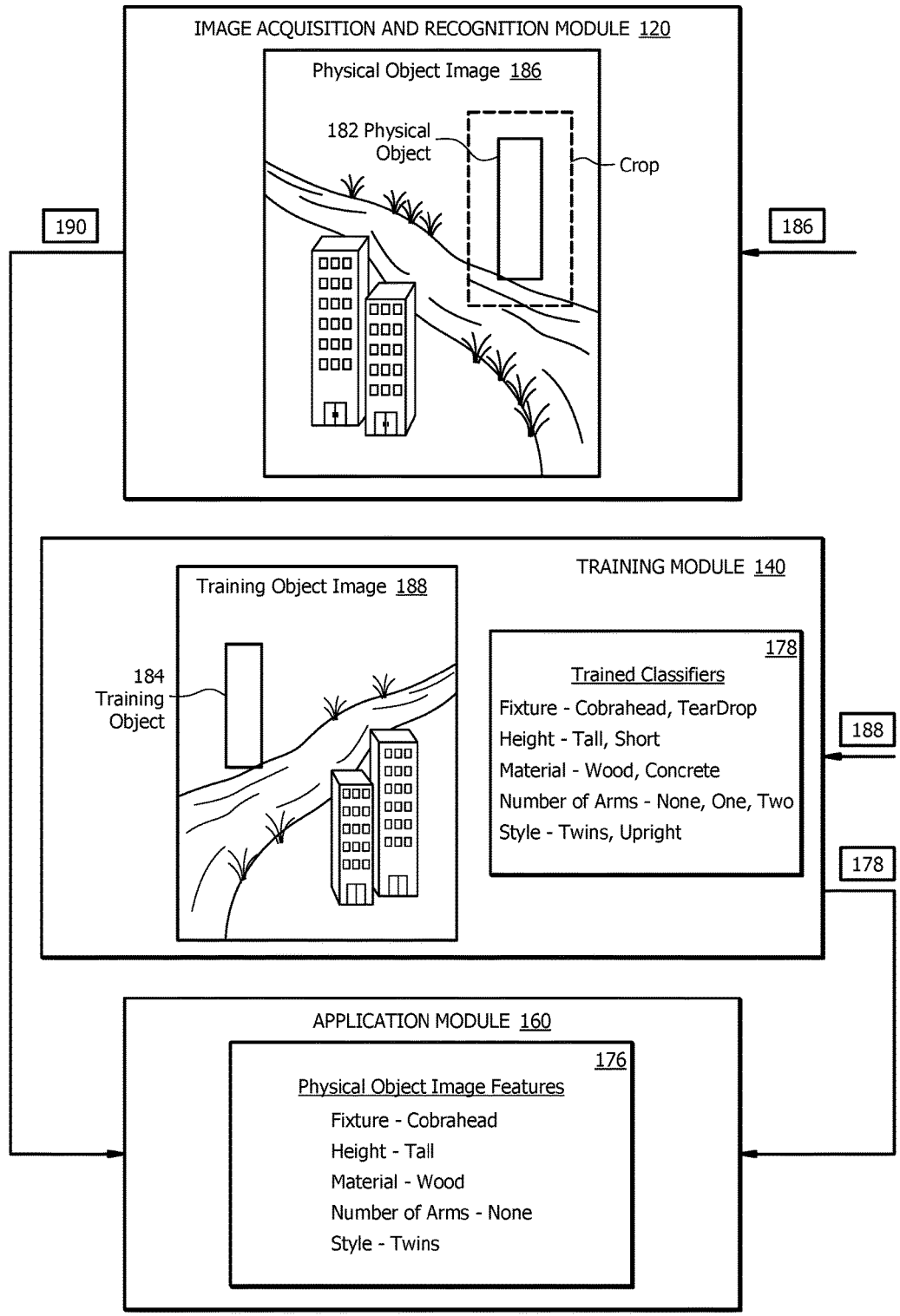
FIG. 1C illustrates additional details of the system of FIGS. 1A and 1B.
Figure 2:
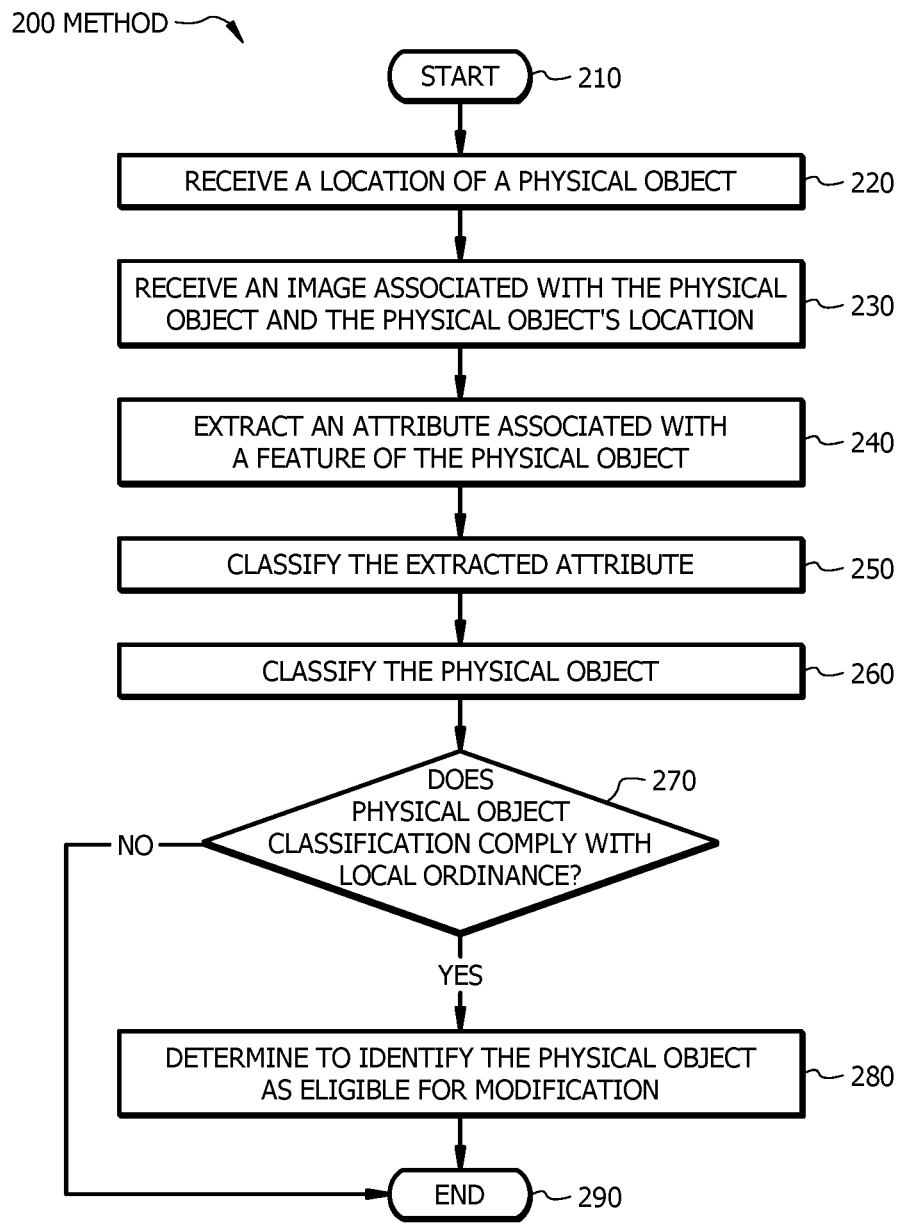
FIG. 2 illustrates an example method for classifying a physical object.
Figure 3:
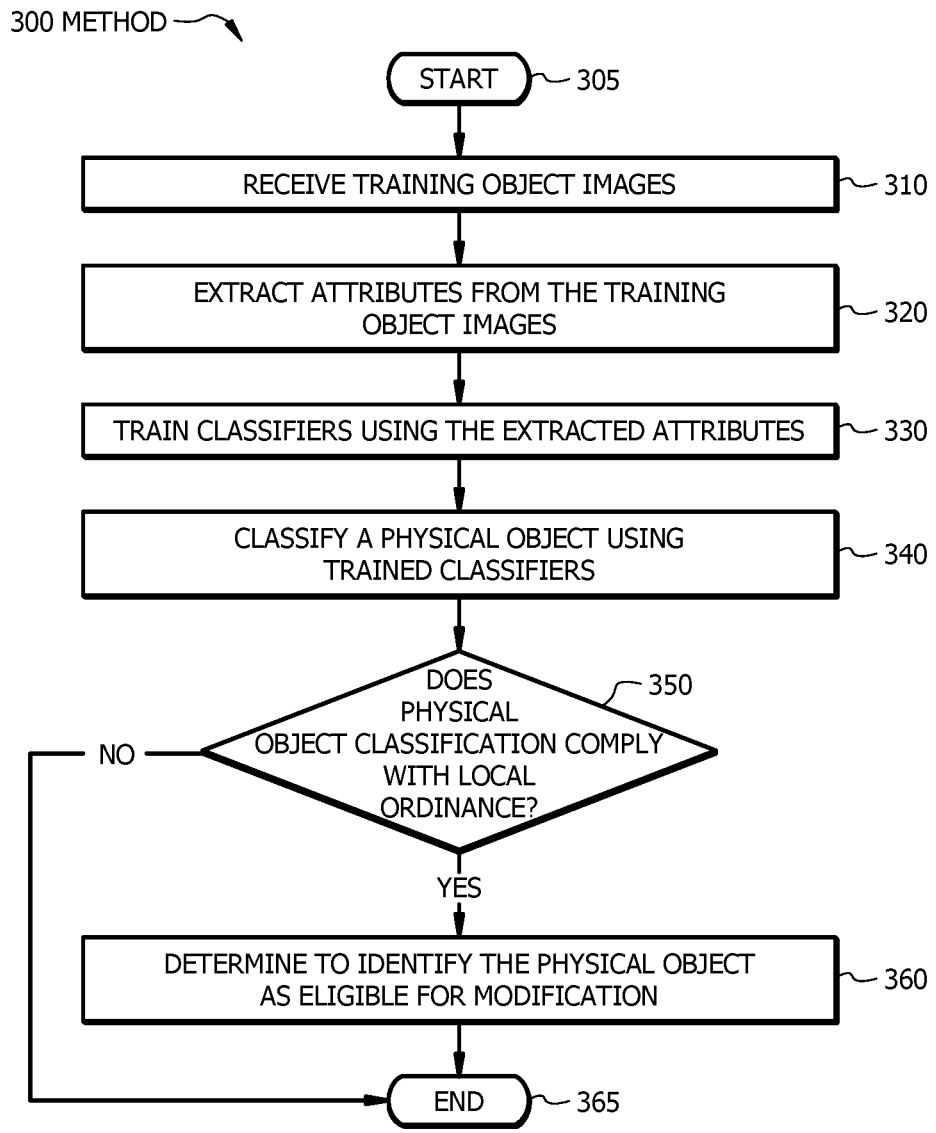
FIG. 3 illustrates an example method for training classifiers that may be used in the method of FIG. 2.
Figure 4:
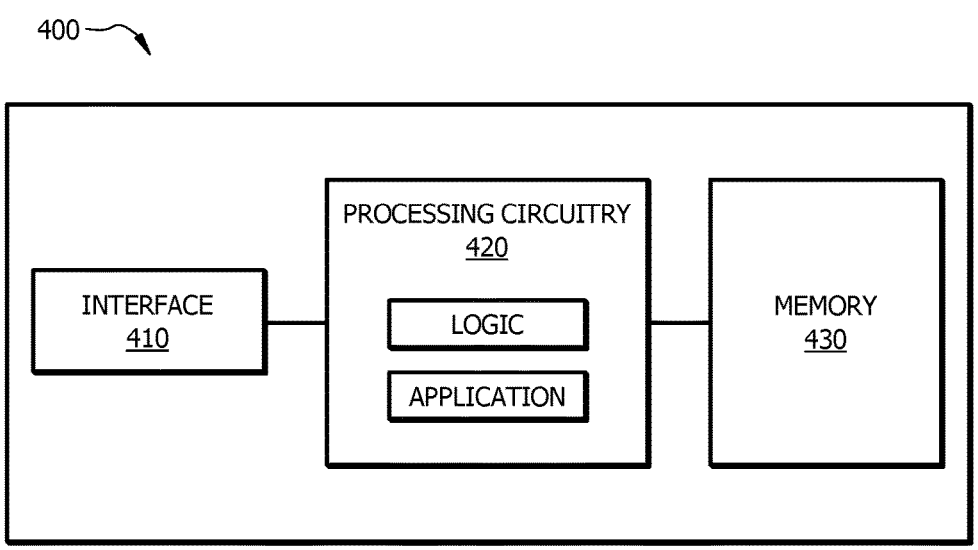
FIG. 4 illustrates an example computer system that may be used by the systems and methods described herein.

FIGS. 1A through 4 show example systems and methods for classifying a physical object. In particular, FIG. 1A shows an example system for classifying a physical object, FIG. 1B shows additional details of the system of FIG. 1A, and FIG. 1C shows additional details of the system of FIGS. 1A and 1B. FIG. 2 shows an example method for classifying a physical object, and FIG. 3 shows an example method for training classifiers that may be used by the method of FIG. 2. FIG. 4 shows an example computer system that may be used by the systems and methods described herein.

FIG. 1A illustrates a system 100 for classifying a physical object, according to certain embodiments. As illustrated in FIG. 1A, system 100 includes a network 110, a network 115, an image acquisition and recognition module 120, a training module 140, an application module 160, a database 180, and a data platform 199 such as an open source data platform. Network 110, image acquisition and recognition module 120, training module 140, application module 160, and database 180 may be associated with an entity 105. Network 110 may be a local area network (LAN) that connects components of entity 105. Network 115 (e.g., the Internet) may link network 110 of entity 105 to data platform 199.

Image acquisition and recognition module 120 is a module for acquiring images and recognizing features in the images. Image acquisition and recognition module 120 may acquire a physical object image 186 of a physical object 182 from data platform 199. Training module 140 is a module for acquiring training data and training classifiers using the acquired training data and a learning algorithm. Training module 140 may acquire training object image 188 of training object 184 from data platform 199 and train classifiers using training object image 188 and a learning algorithm. Application module 160 is a module for classifying attributes extracted from images and classifying objects based at least in part on the classified attributes. Application module 160 may classify one or more attributes extracted from physical object image 186 and then classify physical object 182 based at least in part on the classified attributes. Application module 160 may be used to classify (e.g., pre-qualify) a utility pole for telecommunication equipment installation in accordance with a local ordinance. Database 180 of system 100 stores data received from one or more components of system 100. Database 180 may store objects, images, attributes, locations, and ordinances 181. Data platform 199 is any data platform accessible by network 110, such as an open source data platform, that provides data to system 100.

In operation, image acquisition and recognition module 120 of system 100 receives a location of physical object 182, such as a utility pole, from a pole vendor. Image acquisition and recognition module 120 searches for and retrieves physical object image 186 of physical object 182 from data platform 199 (see notations 86a and 86b), extracts an attribute 190 from physical object image 186, and sends extracted attribute 190 to application module 160 (see notations 90a and 90b). Training module 140 searches for and retrieves one or more training images 188 from data platform 199 (see notations 86a and 86c), trains classifiers 178 using the training images 188, and sends trained classifiers 178 to application module 160 (see notations 90c and 90d). Application module 160 classifies extracted attribute 190 using trained classifiers 178. Application module 160 may then use classified extracted attribute 190 to classify physical object 182. Application module 160 may classify physical object 182 as qualifying for installation of telecommunication equipment in accordance with a local ordinance.

As such, system 100 of FIG. 1A automates the telecommunications equipment candidate site selection process through utilizing an intelligent object recognition framework, which may eliminate or reduce manual data collection and human labor.

FIG. 1B illustrates additional details of system 100 of FIG. 1A. As discussed above, system 100 or portions thereof may be associated with entity 105, which may include any entity, such as a business or company, that classifies objects. Image acquisition and recognition module 120, training module 140, application module 160, and database 180 of system 100 may be included within entity 105 and connected by network 110. The elements of system 100 may be implemented using any suitable combination of hardware, firmware, and software.

Network 110 of system 100 is an LAN that connects components of entity 105. Network 115 (e.g., the Internet) of system 100 links network 110 of entity 105 to data platform 199. Although this disclosure shows network 110 and network 115 as being a particular kind of network, this disclosure contemplates any suitable network. One or more portions of network 110 or network 115 may include an ad hoc network, an intranet, an extranet, a virtual private network (VPN), and LAN, a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 or network 115 may include one or more networks. Network 110 or network 115 may be any communications network, such as a private network, a public network, a connection through Internet, a mobile network, a WI-FI network, etc. One or more components of system 100 may communicate over network 110 or network 115. Application module 160 may communicate over network 110, including receiving data from image acquisition and recognition module 120, training module 140, and database 180. Database 180 may communicate over network 110, including receiving one or more physical object images 186a-n, where n represents any suitable integer, from image acquisition and recognition module 120. Data platform 199 may communicate over network 115, including transmitting one or more physical object images 186 to image acquisition and recognition module 120 and training module 140.

Image acquisition and recognition module 120 of system 100 includes interface 122, memory 124, and processor 126, which may be components of computer system 500. Memory 124 of image acquisition and recognition module 120 stores physical object image search engine 130, physical object image processing engine 132, and attribute extraction engine 134.

Interface 122 of image acquisition and recognition module 120 represents any suitable computer element that can receive information from network 110, transmit information through network 110, perform suitable processing of the information, communicate to other components (e.g., database 180) of system 100, or any combination of the preceding. Interface 122 may receive physical object image 186a (e.g., an image of a utility pole) from a data platform (e.g., a web mapping service) external to an enterprise associated with system 100 via network 110, for example. Interface 122 may also receive physical object image 186a from database 180. Interface 122 may transmit physical object image 186a to database 180. Interface 122 represents any port or connection, real or virtual, including any suitable combination of hardware, firmware, and software, including protocol conversion and data processing capabilities, to communicate through an LAN, a WAN, or other communication system that allows the entity associated with system 100 to exchange information between components of system 100.

Memory 124 of image acquisition and recognition module 120 stores, permanently and/or temporarily, received and transmitted information, as well as system software, control software, other software for image acquisition and recognition module 120, and a variety of other information. Memory 124 of image acquisition and recognition module 120 may store one or more databases (e.g., database 180). Memory 124 includes any one or a combination of volatile or non-volatile local or remote devices suitable for storing information. Memory 124 may include Random Access Memory (RAM), Read-only Memory (ROM), magnetic storage devices, optical storage devices, or any other suitable information storage device or a combination of these devices. Memory 124 may include any suitable information for use in the operation of image acquisition and recognition module 120. Additionally, memory 124 may be a component external to (or may be partially external to) image acquisition and recognition module 120. Memory 124 may be located at any location suitable for memory 124 to communicate with image acquisition and recognition module 120.

Processor 126 of image acquisition and recognition module 120 controls certain operations of image acquisition and recognition module 120 by processing information received from interface 122 and memory 124 or otherwise accessed by processor 126. Processor 126 communicatively couples to interface 122 and memory 124. Processor 126 may include any hardware and/or software that operates to control and process information. Processor 126 may be a programmable logic device, a microcontroller, a microprocessor, any suitable processing device, or any suitable combination of the preceding. Additionally, processor 126 may be a component external to image acquisition and recognition module 120. Processor 126 may be located in any location suitable for processor 126 to communicate with image acquisition and recognition module 120. Processor 126 controls the operation of physical object image search engine 130, physical object image processing engine 132, and attribute extraction engine 134.

Physical object image search engine 130 of image acquisition and recognition module 120 is a computer program that searches for and retrieves information (e.g., digital images) from one or more platforms. An entity associated with system 100 may acquire a physical object location 194a (e.g., a physical address of a utility pole) from a vendor or an open data source, and physical object image search engine 130 may search for and retrieve physical object images 186a-n (as illustrated in database 180) that are within a certain proximity (e.g., 100 feet) or view (e.g., a 360 degree panoramic view) of physical object location 194a. Physical object image search engine 130 may retrieve physical object images 186a-n from a data platform (e.g., an open source data platform).

Physical object image processing engine 132 of image acquisition and recognition module 120 is a computer program that processes information retrieved by physical object image search engine 130. Physical object image processing engine 132 may analyze physical object images 186a-n that include images of physical object 182a and select certain of these images (e.g., physical object images 186a-d) to obtain optimal quality views of physical object 182a. Physical object image processing engine 132 may enhance a presence of physical object 182a in physical object images 186a-n. Physical object image processing engine 132 may enlarge physical object image 186a to focus in on a certain feature (e.g., a height) of physical object 182a, crop physical object image 186a, and/or sharpen physical object image 186a.

Attribute extraction engine 134 of image acquisition and recognition module 120 is a computer program that extracts information (e.g., physical object image attributes 190a-n) from physical object images 186a-n retrieved by physical object image search engine 130. For example, attribute extraction engine 134 may extract a vector from each physical object image 186a-n and each vector may represent physical object image attributes 190a-n of each physical object image 186a-n. An attribute is any characteristic or property of electronic data. Several attributes may represent a combination of elements of a single vector. Each vector may have a predetermined dimensionality having a predetermined number of units. For example, each vector may have a predetermined dimensionality of 2000 that is represented by 2000 units (e.g., numbers). Attribute extraction engine 134 may extract one or more physical object image attributes 190a-n using a pre-trained deep convolutional neural network (CNN) in common object recognition domain. Attribute extraction engine 134 may input physical object image 186a into a feature extraction module of a pre-trained deep convolutional neural network, and the neural network may convert physical object image 186a into physical object image attributes 190a-n represented by vectors. The vectors may be abstract representations of the features of physical object image 186a.

Physical object image attributes 190a-n may be extracted from the vector output from a CNN model. A CNN full model's vector output may include a last layer (i.e., a top layer) and a second last layer, which may include a classification of features. However, the classification of features included in the full model's vector output may not include the features needed to predict the features (e.g., a fixture, a height, or a material) in physical object images 186. Attribute extraction engine 134 may extract the vector output (e.g., a 1000 element numerical vector) of the second last layer, which may include the information needed to later classify the features in physical object images 186. Attribute extraction engine 134 extracts one vector from each physical object image 186 using the pre-trained CNN model. Each vector may represent several physical object image attributes 190*a-n*.

Training module 140 of system 100 includes interface 142, memory 144, and processor 146, which may be components of computer system 500. Memory 144 of training module 140 stores training object image search engine 150 and classification training engine 152.

Interface 142 of training module 140 represents any suitable computer element that can receive information from network 110, transmit information through network 110, perform suitable processing of the information, communicate to other components (e.g., database 180) of system 100, or any combination of the preceding. Interface 142 may receive information (e.g., a digital image) from data platform 199 (e.g., a web mapping service) external to the enterprise associated with system 100 via network 110. Interface 142 may receive information (e.g., physical object images 186*a-n*) from database 180 or image acquisition and recognition module 120. Interface 142 may transmit information to one or more computer programs stored in memory 144 of training module 140. Interface 142 represents any port or connection, real or virtual, including any suitable combination of hardware, firmware, and software, including protocol conversion and data processing capabilities, to communicate through an LAN, a WAN, or other communication system that allows the entity associated with system 100 to exchange information between components of system 100.

Memory 144 of training module 140 stores, permanently and/or temporarily, received and transmitted information, as well as system software, control software, other software for training module 140, and a variety of other information. Memory 144 may store information for execution by processor 146. Memory 144 may store one or more databases (e.g., database 180). Memory 144 includes any one or a combination of volatile or non-volatile local or remote devices suitable for storing information. Memory 144 may include RAM, ROM, magnetic storage devices, optical storage devices, or any other suitable information storage device or a combination of these devices. Memory 144 may include any suitable information for use in the operation of training module 140. Additionally, memory 144 may be a component external to (or may be partially external to) training module 140. Memory 144 may be located at any location suitable for memory 144 to communicate with training module 140.

Processor 146 of training module 140 controls certain operations of training module 140 by processing information received from interface 142 and memory 144 or otherwise accessed by processor 146. Processor 146 communicatively couples to interface 142 and memory 144. Processor 146 includes any hardware and/or software that operates to control and process information. Processor 146 may be a programmable logic device, a microcontroller, a microprocessor, any suitable processing device, or any suitable combination of the preceding. Additionally, processor 146 may be a component external to training module 140. Processor 146 may be located in any location suitable for processor 146 to communicate with training module 140. Processor 146 controls the operation of training object image search engine 150 and classification training engine 152.

Training object image search engine 150 of training module 140 is a computer program that searches for and retrieves training data (e.g., training object images 188*a-n*) from one or sources (e.g., an open data source). Training object image search engine 150 may receive hundreds or thousands of training object images 188*a-n* from a data platform (e.g., an open source data platform). Training object images 188*a-n* are object images with ground truth labels. Ground truth labels represent features that may be used to predict features in physical object images 186. For example, ground truth labels may represent features that include a fixture type, a height, a material, a number of arms, and a style of a utility pole.

Training object image search engine 150 may apply image preprocessing techniques to one or more training object images 188*a-n* to enhance a presence of a training object (e.g., training object 184*a*) in the one or more training object images 188*a-n*. Training object image search engine 150 may extract training object image attributes 192*a-n* from training data (e.g., training object images 188*a-n*) using a pre-trained deep CNN in common object recognition domain. Training object image attributes 192*a-n* may be extracted from the vector output from a CNN model. A CNN full model's vector output may include a last and a second last layer, and training object image search engine 150 may extract the vector output (e.g., a 1000 element numerical vector) of the second last layer, which may include the information needed to later classify the features in physical object images 186. Training object image search engine 150 extracts one vector from each training object image 188 using the pre-trained CNN model. Each vector may represent several training object image attributes 192*a-n*.

Classification training engine 152 of training module 140 is a computer program that trains classifiers using training data and a deep learning algorithm. Classification training engine 152 may receive training data from one or more sources to train classifiers. In the illustrated embodiment, classification training engine receives training data (e.g., training object image attributes 192*a-n*) from training object image search engine 150 and trains classifiers based on the received training data. The trained classifiers may be support vector machine (SVM) classifiers, Random Forest Tree (RFT) classifiers, or Gradient Boosting Machine (GBM) classifiers.

Classification training engine 152 may use the vector extracted from each training object image 188*a-n* as input for training one or more classifiers. The training object image attributes 192*a-n* of each vector represent the ground truth label features (e.g., fixture type, height, material, number of arms, and style) of each training object image 188*a-n*. Classification training engine 152 may train a classifier such that the classifier's output indicates a category of the feature. The trained classifiers may be feature specific. For example, the trained classifiers may include a fixture type classifier, a height classifier, a material classifier, a number of arms classifier, and a style classifier. If the classifier is for a material (e.g., metal, wood, or any other suitable material), the material classifier may include output (e.g., 0.9,0.1,0.1) indicating metal with a largest chance. Classification training engine 152 may train multiple classifiers using the same vector as input.

Classification training engine 152 may train a classifier such that the classifier's output indicates multiple features. For example, a multi-labeling classifier may include all features together as an output of a single classifier such that a single input attributes vector will generate an output indicating a combination of all features (e.g., fixture type, height, material, number of arms, and style). The trained classifiers described above are for discrete data (e.g., a height represented as a tall or short). For continuous data (e.g., a height represented as a number), classification training engine 152 may use regression.

Application module 160 of system 100 includes interface 162, memory 164, and processor 166, which may be components of computer system 500. Memory 164 of application module 160 stores attribute classification engine 170, object classification engine 172, and object selection engine 174.

Interface 162 of application module 160 represents any suitable computer element that can receive information from network 110, transmit information through network 110, perform suitable processing of the information, communicate to other components (e.g., database 180) of system 100, or any combination of the preceding. Interface 162 may receive information (e.g., a digital image) from interface 122 of image acquisition and recognition module 120 and/or interface 142 of training module 140. Interface 162 may transmit information to database 180. Interface 162 represents any port or connection, real or virtual, including any suitable combination of hardware, firmware, and software, including protocol conversion and data processing capabilities, to communicate through an LAN, a WAN, or other communication system that allows the entity associated with system 100 to exchange information between components of system 100.

Memory 164 of application module 160 stores, permanently and/or temporarily, received and transmitted information, as well as system software, control software, other software for application module 160, and a variety of other information. Memory 164 may store information for execution by processor 166. Memory 164 may store one or more databases (e.g., database 180). Memory 164 includes any one or a combination of volatile or non-volatile local or remote devices suitable for storing information. Memory 164 may include RAM, ROM, magnetic storage devices, optical storage devices, or any other suitable information storage device or a combination of these devices. Memory 164 may include any suitable information for use in the operation of application module 160. Additionally, memory 164 may be a component external to (or may be partially external to) application module 160. Memory 164 may be located at any location suitable for memory 164 to communicate with application module 160.

Processor 166 of application module 160 controls certain operations of application module 160 by processing information received from interface 162 and memory 164 or otherwise accessed by processor 166. Processor 166 communicatively couples to interface 162 and memory 164. Processor 166 includes any hardware and/or software that operates to control and process information. Processor 166 may be a programmable logic device, a microcontroller, a microprocessor, any suitable processing device, or any suitable combination of the preceding. Additionally, processor 166 may be a component external to application module 160. Processor 166 may be located in any location suitable for processor 166 to communicate with application module 160. Processor 166 controls the operation of attribute classification engine 170, object classification engine 172, and object selection engine 174.

Attribute classification engine 170 of application module 160 is a computer program that classifies attributes. Attribute classification engine 170 may receive physical object image attributes 190a-n extracted by attribute extraction engine 134 of image acquisition and recognition module 120 and classifiers trained by classification training engine 152 of training module 140. Application module 160 may then use the trained classifiers to classify physical object image attributes 190a-n. For example, application module 160 may classify physical object image attribute 190a as a characteristic (e.g., cobrahead shape) of a feature of physical object 182a in accordance with a classifier trained to classify characteristics of physical objects 182a-n. Attribute classification engine 170 may use a pre-trained neural network (e.g., a CNN model) to classify attributes.

Attribute classification engine 170 of application module 160 may predict an object, a feature, or a characteristic of the feature for one or more physical objects 182a-n. For example, image acquisition and recognition module 120 may collect physical object images 186a, 186b, and 186c for physical object 182a. Attribute classification engine 170 may receive multiple physical object image attributes 190a-n for each physical object image 186a, 186b, and 186c. Attribute classification engine 170 may classify physical object image 186a as a tall utility pole based on physical object image attributes 190a-n extracted from the output vector of physical object image 186a, attribute classification engine 170 may classify physical object image 186b as a tall utility pole based on physical object image attributes 190a-n extracted from the output vector of physical object image 186b, and attribute classification engine 170 may classify physical object image 186c as a short utility pole based on physical object image attributes 190a-n extracted from the output vector of physical object image 186c. Each classification (i.e., tall, tall, and short) may be considered as a vote for the prediction of the characteristic of the feature of physical object 182a. Attribute classification engine 170 may predict that physical object 182a is tall based on a majority vote. Attribute classification engine 170 may transmit the predictions to object classification engine 172.

Object classification engine 172 of application module 160 is a computer program that classifies objects for a particular use. Object classification engine 172 of application module 160 may determine whether physical object 182a qualifies for telecommunication equipment deployment. Object classification engine 172 may receive predictions from attribute classification engine 170 and may classify an object based on the predictions. For example, local ordinance 196a may require tall utility poles made of wood for installation of telecommunication equipment. Object classification engine 172 may determine from the predictions that physical object 182a is a tall utility pole made of wood. Object classification engine 172 may then classify (e.g., pre-qualify) physical object 182a as eligible for installation of telecommunication equipment in accordance with local ordinance 196a. As another example, object classification engine 172 may determine from the predictions that physical object 182a is a tall utility pole made of metal. Object classification engine 172 may then classify physical object 182a as not eligible for installation of telecommunication equipment in accordance with local ordinance 196a. Local ordinances 196a-d may be retrieved from an open source data platform.

Object selection engine 174 of application module 160 is a computer program that selects objects for a particular use. Object selection engine 174 may select physical object 182a for installation of telecommunication equipment deployment. Object selection engine 174 may receive classified objects from object classification engine 172 and may select the object based on the received object classification. Object selection engine 174 may determine from the received object classification that a utility pole is eligible for installation of telecommunication equipment. Based on this eligibility, object selection engine 174 may select the utility pole for installation of telecommunication equipment. Selecting the object may include initiating an on-site inspection of the object.

Database 180 is any database that can store data associated with system 100. Database 180 may store certain types of information for entity 105. Database 180 may be a single database or may include multiple databases 180a-n. Database 180 stores objects, images, attributes, locations, and ordinances 181. Objects, images, attributes, locations, and ordinances 181 include physical objects 182a-n, stores training objects 184a-n, physical object images 186a-n, training object images 188a-n, physical object image attributes 190a-n, training object image attributes 192a-n, physical object locations 194a-n, and local ordinances 196a-n.

Physical objects 182a-n include any physical object that may be captured in an image. Physical objects 182a-n may include utility poles (e.g., power or light poles), traffic signals, buildings, and/or facilities. Training objects 184a-n include any objects found in images used to train classifiers. Training objects 184a-n may include utility poles (e.g., power or light poles), traffic signals, buildings, and/or facilities. Physical object images 186a-n include any images of physical objects 182a-n. Training object images 188a-n include any images of training objects 184a-n.

Physical object image attributes 190a-n include attributes extracted from physical object images 186a-n. Physical object image attributes 190a-n may include attributes (e.g., vectors) extracted by attribute extraction engine 134. Training object image attributes 192a-n include attributes extracted from training object images 188a-n. Training object image attributes 190a-n may include attributes (e.g., vectors) extracted by training object search engine 150. Training object image attributes 192a-n may represent ground truth labels, which are object labels determined to accurately represent certain features of an object. The ground truth labels may represent a fixture, height, material, number of arms, or style of training object 184a that are deemed accurate through direct observation.

Physical object locations 194a-n represent locations of physical objects 182a-n. Physical object locations 194a-n may include Global Positioning System (GPS) coordinates of a physical object (e.g., a facility). Physical object locations 194a-n may include an address of a physical object (e.g., a utility pole) received from a pole vendor. Local ordinances 196a-n include government regulations. Local ordinances 196a-n may include telecommunication equipment installation guidelines for a municipality. Local ordinances 196a-n may include a schematic representation (e.g., an image) of installation requirements for telecommunication equipment.

Database 180 includes any one or a combination of volatile or non-volatile local or remote devices suitable for storing information. Database 180 may include RAM, ROM, magnetic storage devices, optical storage devices, or any other suitable information storage device or a combination of these devices. Although database 180 is shown separate from image acquisition and recognition module 120, training module 140, and application module 160 in FIG. 1, database 180 may be located in any location suitable for communication with image acquisition and recognition module 120, training module 140, and application module 160. Database 180 may be externally located from system 100. Database 180 may be located in image acquisition and recognition module 120, training module 140, or application module 160. Although described as a database, database 180 may be implemented as any suitable type of volatile or non-volatile memory. Database 180 may include one or more interfaces and/or processor.

Data platform 199 is any data platform that provides data to system 100. Data platform 199 may be an open source data platform. Data platform 199 may provide physical object images 186a-n and training object images 188a-n to system 100. Data platform 199 may provide images of street views, aerial views, panoramic views, and the like.

Although FIG. 1B illustrates a particular arrangement of network 110, network 115, image acquisition and recognition module 120, training module 140, application module 160, database 180, and data platform 199, this disclosure contemplates any suitable arrangement of network 110, network 115, image acquisition and recognition module 120, training module 140, application module 160, database 180, and data platform 199. Two or more of image acquisition and recognition module 120, training module 140, application module 160, and database 180 may be connected to each other directly, bypassing network 110. Two or more of image acquisition and recognition module 120, training module 140, application module 160, and database 180 may be physically or logically co-located with each other in whole or in part. Although FIG. 1 illustrates a particular number of networks 110, networks 115, image acquisition and recognition modules 120, training modules 140, application modules 160, databases 180, and data platforms 199, this disclosure contemplates any suitable number of networks 110, networks 115, image acquisition and recognition modules 120, training modules 140, application modules 160, databases 180, and data platforms 199.

Although FIG. 1B utilizes a pre-trained CNN model, this disclosure contemplates the use of any suitable model. For example, entity 105 may develop a CNN model, train weights of a classifier layer for the developed CNN model, and use the CNN model to classify physical objects.

FIG. 1C illustrates additional details of system 100 of FIGS. 1A and 1B, according to certain embodiments. Physical object image 186 is shown in FIG. 1C as being received by image acquisition and recognition module 120. Physical object image 186 may be an image retrieved by physical object image search engine 130 (as illustrated in FIG. 1B) of image acquisition and recognition module 120. Physical object image search engine 130 may search data platform 199 for physical object location 194 (e.g., an address in Dallas, Tex.) received from a pole vendor, and based on a search of this location, retrieve physical object image 186. Physical object image processing engine 132 (as illustrated in FIG. 1B) of image acquisition and recognition module 120 may then process physical object image 186 to enhance a presence of physical object 182. For example, physical object image processing engine 132 may crop physical object image 186 and enlarge the cropped image. Physical object image search engine 130 of image acquisition and recognition module 120 may retrieve additional physical object images 186 of physical object location 194, and physical object image processing engine 132 may select certain images 186 to obtain optimal quality views of physical object 182. Selected images 186 may be combined prior to classifying physical object 182. Attribute extraction engine 134 (as illustrated in FIG. 1B) of image acquisition and recognition module 120 may extract attributes 190 from physical object image 186.

Training object image 188, as illustrated in training module 140 of FIG. 1C, may be an image received by training module 140. Training object image search engine 150 (as illustrated in FIG. 1B) of training module 140 may search a source (e.g., data platform 199) for training object images 188a-n. Classification training engine 152 of training module 140 may then train classifiers 178 based at least in part on training object image 188. Training classifiers 178 may be performed using a pre-trained neural network (e.g., a CNN model). Trained classifiers 178 are determined based on training data. Classification training engine 152 may extract attributes associated with features (e.g., a height of training object 184) of training object image 188 and train classifiers to recognize these features in physical object image 186. Classification training engine 152 may extract attributes associated with characteristics (e.g., wood and concrete) of the features (e.g., a material of training object 184) of training object image 188 and train classifiers to recognize these characteristics in physical object images 186*a-n*.

Trained classifiers 178, as illustrated in training module 140 of FIG. 1C, are determined based on one or more training object images 188. Trained classifiers 178 are determined from data extracted from training object images 188*a-n*. Trained classifiers 178 may be represented by the following features and associated characteristics: fixtures—cobrahead and teardrop shape; height—tall and short; material—wood and concrete; number of arms—none, one, and two; and style—twins and upright.

Application module 160 of FIG. 1C may receive extracted physical object image attributes 190 from image acquisition and recognition module 120 and trained classifiers 178 from training module 140. Physical object image features 176, as illustrated in application module 160 of FIG. 1C, are based on the classification of physical object image attributes 190 extracted from physical object image 186. Attribute classification engine 170 (as illustrated in FIG. 1B) of application module 160 may classify physical object image attributes 190 of physical object image 186 using trained classifiers 178. Characteristics associated with physical object image features 176 are determined based on one or more physical object image attributes 190 that have been classified. In the illustrated embodiment, the fixture is classified as having a cobrahead shape; the height is classified as tall; the material is classified as wood; the number of arms is classified as none; and the style is classified as twins.

FIG. 2 illustrates an example method for classifying a physical object, according to certain embodiments. Method 200 begins at step 210. At step 220, a location of a physical object is received. In the embodiments of FIGS. 1A-1C, image acquisition and recognition module 120 of system 100 may receive physical object location 194 of physical object 182 (e.g., a utility pole) from a pole vendor or from a data platform. Method 200 then proceeds to step 230. At step 230, one or more images associated with the physical object and the physical object's location are received. For example, physical object image search engine 130 of system 100 may retrieve one or more physical object images 186 from a data platform.

Physical object images may represent images taken at different times (e.g., daytime, nighttime, summer, and winter), at different angles, and/or from different distances. Images are selected to obtain optimal quality views of the physical object. Physical object image search engine 130 may retrieve 100 images of the physical object and the physical object's location, and physical object image processing engine 132 may select twenty of these images to obtain optimal quality views. Multiple images may improve the ability of object classification engine 172 to accurately classify the physical object. A first image of the physical object taken during the day may capture a reflective quality of the physical object that is not captured in a second image taken at night. This reflective quality may assist in distinguishing a characteristic (e.g., metal or wood) of a feature (e.g., material) of the physical object.

At step 240, one or more attributes associated with one or more features of the physical object are extracted. Attribute extraction engine 134 of system 100 may extract an attribute from a vector with a predetermined dimensionality from physical object image 186. Method 200 then moves to step 250, where the extracted attributes are classified. Attribute classification engine 170 may classify the extracted attribute based on trained classifiers. Attribute classification engine 170 may recognize that extracted physical object image attribute 190 is a cobrahead fixture based on a trained classifier (e.g., trained classifier 178) for a cobrahead fixture. Attribute classification engine 170 may classify attributes from several physical object images 188*a-n* and predict a characteristic of a feature (e.g., a tall height) of physical object 182 using the voting method described in FIG. 1B.

At step 260, the physical object is classified. The physical object may be classified based at least in part on the classifications of the one or more extracted attributes. The classified extracted attributes may associate the physical object with a cobrahead fixture, a tall height, a wood material, no arms, and a twins style.

At step 270, a determination is made as to whether the physical object's classification complies with a local ordinance. If the physical object's classification indicates that one or more physical objects 182 and/or physical object locations 182 comply with one or more local ordinances 196, method 200 proceeds to step 280, where a determination is made to identify the physical object as eligible for modification. Determining to identify the physical object as eligible for modification may include tagging the physical object as eligible for the installation of telecommunication equipment (e.g., a small cell) in accordance with the local ordinance. Method 200 then advances to step 290, where method 200 ends. If the physical object's classification indicates that one or more physical objects 182 and/or physical object locations 182 do not comply with one or more local ordinances 196, method 200 advances from step 270 to step 290, where method 200 ends.

Modifications, additions, or omissions may be made to method 200 depicted in FIG. 2. Method 200 may include more, fewer, or other steps. More than one image associated with the physical object and the physical object's location may be received. A notification may be sent to an entity reporting the status of the whether the physical object's classification complies with a local ordinance prior to method 200 ending. In the event the physical object's classification indicates that the physical object does not comply with the local ordinance, method 200 may repeat steps 220 through 280 for a second physical object. Steps may also be performed in parallel or in any suitable order. Although discussed as specific components completing the steps of method 200, any suitable component of system 100 may perform any step of method 200.

FIG. 3 illustrates an example method for training classifiers that may be used in the method of FIG. 2. Method 300 begins at step 305. At step 310, one or more training object images are received. For example, training object image search engine 130 of system 100 may retrieve training object images 188*a-n* from a data platform.

At step 320, one or more attributes are extracted from the training object images. For example, attribute extraction engine 134 of system 100 may extract an attribute from a vector output of training object image 188*a*. At step 330, classifiers may be trained using the extracted attributes. Classification training engine 152 may use one or more data platforms to train classifiers. The trained classifiers (e.g., trained classifiers 178) may be represented in any suitable format (e.g., a table of trained classifiers). The trained classifiers are ground truth labels that represent features and characteristics of the training objects.

At step 340, a physical object is classified using the trained classifiers. For example, physical object image search engine 130 may retrieve physical object image 186 of physical object 182 from a data platform, attribute extraction engine 134 may extract physical object image attributes 190 from physical object image 186, attribute classification engine 170 may classify extracted physical object image attributes 190 using the trained classifiers, and object classification engine 172 may classify physical object 182 based on the classified extracted attributes. At step 350, a determination is made as to whether the physical object classification complies with a local ordinance (e.g., local ordinance 196a). If the physical object classification complies with the local ordinance, then method 300 advances from step 350 to step 360, where a determination is made to identify the physical object as eligible for modification (e.g., the installation of telecommunication equipment). Method 300 then advances from step 360 to step 365, where method 300 ends. If the physical object classification does not comply with the local ordinance, then method 300 advances from step 350 to step 365, where method 300 ends.

Modifications, additions, or omissions may be made to method 300 depicted in FIG. 3. Method 300 may include more, fewer, or other steps. A third physical object may be classified using the trained classifiers. Step 350 may be modified to determine whether the physical object classification complies with a product manufacturer's or service provider's installation requirements. Steps may also be performed in parallel or in any suitable order. While discussed as specific components completing the steps of method 300, any suitable component of system 100 may perform any step of method 300.

FIG. 4 illustrates an example of elements 400 that may be included in system 100 of FIG. 1, according to certain embodiments. For example, any of network 110, image acquisition and recognition module 120, training module 140, application module 160, and/or database 180 may include one or more interface(s) 410, processing circuitry 420, memory(ies) 430, and/or other suitable element(s). Interface 410 (e.g., interface 122, 142, or 162 of FIG. 1B) receives input, sends output, processes the input and/or output, and/or performs other suitable operation. Interface 410 may comprise hardware and/or software.

Processing circuitry 420 (e.g., processor 126, 146, or 166 of FIG. 1B) performs or manages the operations of the component. Processing circuitry 420 may include hardware and/or software. Examples of a processing circuitry include one or more computers, one or more microprocessors, one or more applications, etc. In certain embodiments, processing circuitry 420 executes logic (e.g., instructions) to perform actions (e.g., operations), such as generating output from input. The logic executed by processing circuitry 420 may be encoded in one or more tangible, non-transitory computer readable media (such as memory 430). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 430 (or memory unit) stores information. Memory 430 (e.g., memory 124, 144, or 164 of FIG. 1B) may comprise one or more non-transitory, tangible, computer-readable, and/or computer-executable storage media. Examples of memory 430 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system comprising one or more processors and a memory storing instructions that, when executed by the one or more processors, cause the one or more processors to perform operations comprising:
   receiving a location of a potential structure for installation of telecommunication equipment;
   receiving from a data platform an image of the potential structure;

extracting from the image an attribute associated with at least one of a fixture, a height, a material, a number of arms, and a style of the potential structure;
classifying the attribute by associating the attribute with a characteristic of the at least one of the fixture, the height, the material, the number of arms, and the style of the potential structure;
classifying the potential structure for the installation of the telecommunication equipment in accordance with a local ordinance;
determining to identify the potential structure as eligible for the installation of the telecommunication equipment;
receiving one or more training images;
extracting a training attribute from each of the training images; and
training one or more classifiers using a deep learning algorithm and the training attributes, wherein the attribute is classified based at least in part on the one or more classifiers.

2. The system of claim 1, wherein:
the potential structure is a utility pole;
the attribute is represented by a vector with a predetermined dimensionality; and
the data platform is an open source data platform.

3. The system of claim 1, wherein:
each training attribute is represented by a vector with a predetermined dimensionality;
each training attribute represents one or more ground truth labels; and
each training attribute is associated with at least one of the following:
a fixture;
a height;
a material;
a number of arms; and
a style.

4. The system of claim 1, wherein the operations further comprise processing the image to enhance a presence of the potential structure, wherein processing the image comprises at least one of the following:
enlarging the image;
cropping the image; and
sharpening the image.

5. The system of claim 1, wherein the operations further comprise:
receiving a second image associated with the potential structure and the location of the potential structure;
selecting the image and the second image to combine for obtaining optimal quality views of the potential structure;
combining the image and the second image after classifying the attribute and before classifying the potential structure.

6. A method, comprising:
receiving, by one or more interfaces, a location of a physical object;
receiving, by the one or more interfaces and from a data platform, an image associated with the physical object and the location of the physical object;
extracting, by one or more processors and from the image, an attribute associated with a feature of the physical object;
classifying, by one or more processors, the attribute, wherein classifying the attribute comprises associating the attribute with a characteristic of the feature of the physical object;

classifying, by the one or more processors, the physical object; and
determining, by the one or more processors, to identify the physical object as eligible for modification;
receiving, by the one or more interfaces, one or more training images;
extracting, by the one or more processors, a training attribute from each of the training images;
training, by the one or more processors, one or more classifiers using a deep learning algorithm and the training attributes, wherein the attribute is classified based at least in part on the one or more classifiers.

7. The method of claim 6, wherein:
the physical object is a utility pole;
the attribute is represented by a vector with a predetermined dimensionality; and
the feature of the physical object is at least one of the following:
a fixture;
a height;
a material;
a number of arms; and
a style.

8. The method of claim 6, wherein:
each training attribute is represented by a vector with a predetermined dimensionality;
each training attribute represents one or more ground truth labels; and
each training attribute is associated with at least one of the following:
a fixture;
a height;
a material;
a number of arms; and
a style.

9. The method of claim 6, wherein determining to identify the physical object as eligible for modification comprises tagging the physical object as eligible for installation of telecommunication equipment in accordance with a local ordinance.

10. The method of claim 6, further comprising:
receiving, by the one or more interfaces, a second image associated with the physical object and the location of the physical object;
selecting, by the one or more processors, the image and the second image to combine for obtaining optimal quality views of the physical object;
combining, by the one or more processors, the image and the second image after classifying the attribute and before classifying the physical object.

11. The method of claim 6, further comprising processing, by the one or more processors, the image to enhance a presence of the physical object, wherein processing the image comprises at least one of the following:
enlarging the image;
cropping the image; and
sharpening the image.

12. One or more non-transitory computer-readable storage media embodying instructions that, when executed by a processor, cause the processor to perform operations comprising:
receiving a location of a physical object;
receiving an image associated with the physical object and the location of the physical object;
extracting an attribute associated with a feature of the physical object from the image;

classifying the attribute, wherein classifying the attribute comprises associating the attribute with a characteristic of the feature of the physical object;

classifying the physical object;

determining to identify the physical object as eligible for modification;

receiving one or more training images;

extracting a training attribute from each of the training images; and training one or more classifiers using a deep learning algorithm and the training attributes, wherein the attribute is classified based at least in part on the one or more classifiers.

13. The one or more non-transitory computer-readable storage media of claim 12, wherein:

the physical object is a utility pole;

the attribute is represented by a vector with a predetermined dimensionality; and the feature of the physical object is at least one of the following:
- a fixture;
- a height;
- a material;
- a number of arms; and
- a style.

14. The one or more non-transitory computer-readable storage media of claim 12, wherein:

the training images are received from a second data platform;

each training attribute represents a ground truth label that is in compliance with a local ordinance; and each training attribute is associated with at least one of the following:
- a fixture;
- a height;
- a material;
- a number of arms; and
- a style.

15. The one or more non-transitory computer-readable storage media of claim 12, wherein determining to identify the physical object as eligible for modification comprises tagging the physical object as eligible for installation of telecommunication equipment in accordance with a local ordinance.

16. The one or more non-transitory computer-readable storage media of claim 12, wherein the operations further comprise:

receiving a second image associated with the physical object and the physical object's location;

selecting the image and the second image to combine for obtaining optimal quality views of the physical object; and combining the image and the second image after classifying the extracted attribute and before classifying the physical object.

17. The one or more non-transitory computer-readable storage media of claim 12, wherein the operations further comprise processing the image to enhance a presence of the physical object, wherein processing the image comprises at least one of the following:

enlarging the image;

cropping the image; and sharpening the image.

* * * * *